June 26, 1962
R. S. BROWN
3,040,407
TUBING CLAMP
Filed Aug. 6, 1959
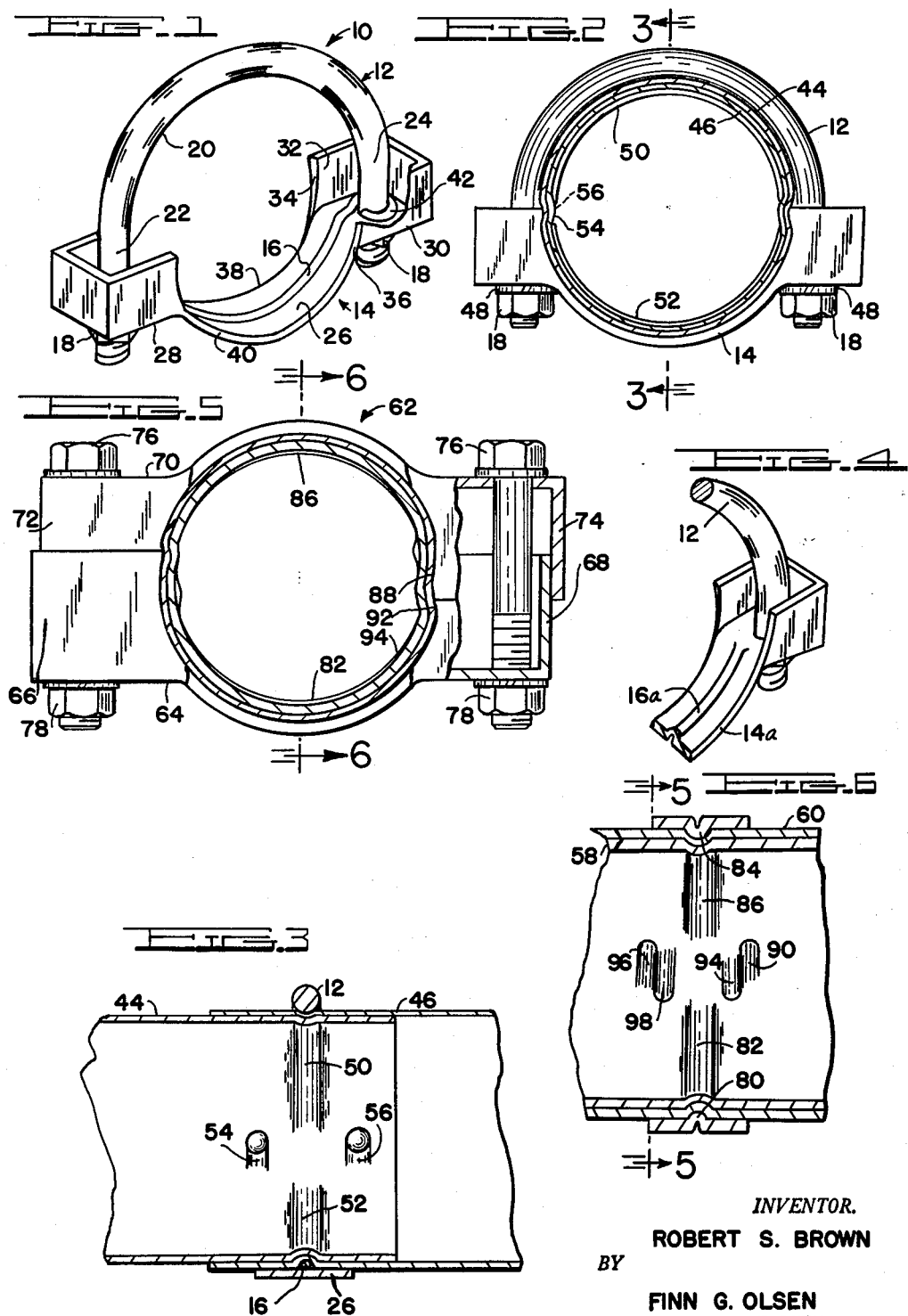
INVENTOR.
ROBERT S. BROWN
BY
FINN G. OLSEN
ATTORNEY

# United States Patent Office 3,040,407
Patented June 26, 1962

3,040,407
TUBING CLAMP
Robert S. Brown, 2601 Sylvan Road, Rte. 2,
Chelsea, Mich.
Filed Aug. 6, 1959, Ser. No. 832,045
14 Claims. (Cl. 24—277)

The present invention relates to tubing clamps, and more particularly to improvements in tubing clamps which are employed for sealing together two sections of telescoped tubing, such as occurs at the juncture between the muffler and the end of the manifold pipe of an automobile.

It is an object of the present invention to provide an improved clamp for telescoped sections of tubing or other tubular structures which will effectively seal substantially the entire three hundred sixty degree circumference of the telescoped portions.

It is another object of the present invention to provide an improved clamp of the foregoing character wherein substantially no portion of the clamp projects below the telescoped tubing, thereby eliminating undesirable obstructions below such tubing.

It is another object of the present invention to provide a tubing clamp of the foregoing character which is constructed and arranged so that it can be manufactured by mass production procedures with a minimum number of parts being employed.

It is still another object of the present invention to provide a tubing clamp which is constructed and arranged to provide an effective seal around the entire three hundred sixty degree circumference of telescoped parts, and wherein the clamp comprises two semi-circular saddle-like structures of substantially identical construction so that one standardized saddle-like member can be manufactured, thereby reducing manufacturing costs of the same.

Other objects of this invention will appear in the following description and appended claims, reference being had to the accompanying drawing forming a part of this specification wherein like reference characters designate corresponding parts in the several views.

In the drawing:

FIGURE 1 is a view in perspective of a clamp embodying one form of the present invention;

FIGURE 2 is a front elevation of the embodiment illustrated in FIGURE 1 showing in section two telescoping tubes clamped together;

FIGURE 3 is a longitudinal section taken on the line 3—3 of FIGURE 2;

FIGURE 4 is a fragmentary view in perspective of another form of the present invention;

FIGURE 5 is a front elevation with portions in section illustrating still another embodiment of the present invention; and FIGURE 6 is a longitudinal section taken on the line 6—6 of FIGURE 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the embodiment illustrated in FIGURES 1, 2 and 3 will first be described in greater detail. The tubing clamp 10 includes the U-bolt 12, the opposite saddle-like member 14, the wire element 16 and the conventional nuts 18 which are threadedly connected to the free ends of the U-bolt 12. The U-bolt 12 is a conventional type having a semi-circular portion 20, the inner circumference of which corresponds to a ridge, said portion 20 terminating in straight arms 22 and 24 which constitute tangential extensions of the ends of the semi-circular portion 20. The free ends of the arms 22 and 24 are threaded for the purpose of receiving the nuts 18.

The saddle-like member 14 has a semi-circular portion 26 which extends for nearly one hundred eighty degrees and then terminates at its opposite ends in radially outwardly directed end portions 28 and 30. In the presently described embodiment of the invention, the end portions 28 and 30 have substantially the same construction, and therefore, only the end portion 30 will be described in detail.

The end portion 30 has a bolt hole therein through which projects the arm 24 of the bolt 12. The three edges of the end portion 30 which are located away from the semi-circular portion 26 have a continuous flange 32 projecting in the general direction of the closed end of the U-bolt 12. The two radially inner edges 34 and 36 form tangential extensions of the opposite edges 38 and 40 of the semi-circular portion 26. The purpose of the edges 34 and 36 will be described hereinafter.

The wire element 16 is shaped to fit the inner circumference of the semi-circular portion 26 and forms a ridge-like part thereof, and the element 16 has a pair of loops 42, one being positioned at each end. The loops 42 are of sufficient diameter so that the arms 22 and 24 of the U-bolt 12 can be passed therethrough, as can be seen best in FIGURE 1.

The manner in which the tubing clamp 10 is secured in place on a pair of telescoped tubes and the effect the tubing clamp 10 has on these tubes will now be described. As shown in FIGURES 2 and 3, a pair of tubes 44 and 46 are shown telescoped together. The tubing clamp 10 is initially in a disassembled state and the U-bolt 12 and the saddle-like member 14 are then assembled so that they encircle the telescoped portions of the tubes 44 and 46. Thereafter, the nuts 18 are threaded tightly in place, and if desired, lock washers 48 may be used to assure that the nuts 18 will not inadvertently come loose. The tightening of the nuts 18 will have the effect of drawing the U-bolt 12 and the saddle-like member 14 tightly together. This will have the effect of forming depressions in the tubes 44 and 46, and as will presently be seen, these depressions are located so as to provide in effect, substantially a three hundred sixty degree seal between the tubes 44 and 46. The semi-circular portion of the U-bolt 12 will have the effect of providing substantially a one hundred eighty degree depression, as shown at 50. The wire element 16 will have the effect of producing a depression 52 extending around a major portion of the lower half of the juncture between the tubes 44 and 46. This will leave small segments on opposite sides of the juncture of the tubes 44 and 46 which are not depressed by either the U-bolt 12 or the spring element 16. However, this segment is compensated for by the pressure exerted by the edges 34 and 36 against the tubes 44 and 46, whereby depressions 54 and 56 are provided.

The edges 34 and 36 function to form the depressions 54 and 56 in a rather unique manner. This is accomplished merely by drawing the nuts 18 tightly up on the threaded portions of the arms 22 and 24 of the U-bolt 12. When this tightening action occurs, it will result in the nuts 18 pressing upward on the radially extending end portions 28 and 30 thereby causing a limited pivotal movement of the same in an upward direction around the ends of the semi-circular portion 26. This pivotal movement will tend to press the edges 34 and 36 radially inwardly toward the center of the tubes 44 and 46 thereby causing the depressions 54 and 56. As can be seen in FIGURE 3, the depressions 54 and 56 substantially extend between the ends of the depressions 50 and 52, thereby providing substantially a three hundred sixty degree seal between the tubes 44 and 46.

From the foregoing, it can be seen that the tubing clamp 10 provides a construction and arrangement whereby substantially three hundred sixty degree seal is provided between the telescoping tubes 44 and 46. Also, it can be seen that there is substantially no projection of the tubing clamp 10 below the lowermost part of the outer tube 46. The only projection which occurs below the tube 46 is the relatively thin sheet metal strip which comprises the semi-circular portion 26 of the saddle-like member 14.

For the purpose of large quantity production, and the economy that is derived therefrom, it may be desired to eliminate the wire element 16, and for this purpose a relatively small change may be made in the saddle-like member 14. For a brief description of this embodiment of the invention, attention is directed to FIGURE 4 of the drawing. As here shown, the saddle-like member 14a has formed in the sheet metal strip a protrusion or ridge-like part 16a which corresponds to the spring element or protrusion 16 illustrated in FIGURE 1. In other respects, the embodiment illustrated in FIGURE 4 is the same as the one illustrated in FIGURE 1, and these two embodiments function substantially the same.

Reference is now made to FIGURES 5 and 6 for a description of still another embodiment of the present invention. In this embodiment the U-bolt has been eliminated and in place thereof a second saddle-like member has been provided. In order to reduce the number of parts the two saddle-like members are made identically the same and are interchangeable. This embodiment has an advantage over the two embodiments previously described in that there will be a double set of end flanges having radially inner edges corresponding to the edges 34 and 36, FIGURE 1, which will function to provide depressions in the telescoping tubes 58 and 60. In this embodiment the tubing clamp 62 has a lower saddle-like member 64 which is constructed substantially the same as the saddle-like member 14 except that the box-like flange 66 encloses a relatively larger area than the box-like flange 68 at the opposite end. As previously stated, the opposite or upper saddle-like member 70 is constructed identically the same as the saddle-like member 64. Thus, the saddle-like member 70 has a larger box-like flange arrangement at its right end than at its left end, when viewed in FIGURE 5, and therefore the box-like flange 74 will telescope over the box-like flange 68, and conversely at the opposite end, the box-like flange 66 of the lower saddle-like member 64 will telescope over the box-like flange 74. In other respects, the saddle-like members 64 and 70 are substantially the same as the saddle-like member 40 and function in a corresponding manner. In the embodiment of FIGURES 5 and 6, a pair of bolts 76 extend through the openings in the end portions of the saddle-like members 64 and 70, and nuts 78 are threadedly connected to the ends of bolts 76 and are drawn tight. When this is done the ridge 80 in the saddle-like member 64 will cause an inward depression 82 to be formed in the lower half of the juncture between the two tubes 58 and 60, and in a like manner the ridge 84 will cause an inward depression 86 to be formed in the upper half of the juncture of the tubes 58 and 60. At the same time, the right end portion of the saddle-like member 70 will be slightly pivoted so that the edge 88 will cause the depression 90 to be formed and the edge 92 (partially concealed) of the lower saddle-like member 64 will produce the depression 94. Similarly, the corresponding parallel spaced edges (not shown) on the opposite face of the tubing clamp 62 will produce the indentations 94 and 96. In the same manner, the four edges of the box-like flanges 66 and 72 on the left side of FIGURE 5 will cause four depressions. Thus, this construction will produce substantially a three hundred sixty degree seal between the juncture of the telescoping tubes 58 and 60. Also, as pointed out above, only one set of dies is required to manufacture the saddle-like members 64 and 70, since they are constructed identically the same. This has the distinct advantage of reducing the manufacturing costs of this embodiment of the invention.

Having thus described my invention, I claim:

1. An external clamp for securing telescoped metal tubes together comprising a U-bolt having a semi-circular portion and parallel spaced tangential arms integral therewith, a saddle for said U-bolt having a sheet metal strip extending circumferentially not more than one hundred eighty degrees and then turned radially outward at opposite ends, the circumferential portion of said strip being flexible for bending about the axis of the saddle, said opposite ends having bolt holes therein for receiving the tangential arms of said U-bolt and having spaced parallel integral flanges projecting as tangential extensions from the edges of said saddle toward said U-bolt, a relatively hard wire element seated lengthwise around the inner circumference of said saddle with loops at its ends through which said tangential arms pass so that said element forms an inward projection from said saddle, and nuts threadedly connected to the free ends of said tangential arms.

2. An external clamp for securing telescoped metal tubes together comprising a U-bolt having a semi-circular portion and parallel spaced tangential arms integral therewith, a saddle for said U-bolt having a sheet metal strip extending circumferentially approximately one hundred eighty degrees and then turned radially outwardly at opposite ends, the circumferential portion of said strip being flexible for bending about the axis of the saddle, said opposite ends having bolt holes therethrough for receiving the tangential arms of said U-bolt and having spaced parallel integral flanges projecting toward said U-bolt with the inner edges of said flanges forming tangential extensions of the edges of said saddle, a radially inwardly directed protrusion extending around the inner circumference of said saddle, and nuts threadedly connected to the free ends of said tangential arms.

3. An external clamp as is claimed in claim 2 wherein said radially inwardly directed protrusion is a wire element seated lengthwise around the inner circumference of said saddle with loops at its ends through which said tangential arms pass.

4. An external clamp as is claimed in claim 2 wherein said radially inwardly directed protrusion is a radially inwardly directed ridge formed in the sheet metal strip around the inner circumference thereof.

5. An external clamp for securing telescoped metal tubes together comprising a U-bolt having a semi-circular portion and parallel spaced tangential arms integral therewith, a saddle for said U-bolt having a sheet metal strip extending circumferentially approximately one hundred eighty degrees and then turned radially outwardly at opposite ends and having bolt holes extending therethrough for receiving the tangential arms of said U-bolt, the circumferential portion of said strip being flexible for bending about the axis of the saddle, said opposite ends having box-like flanges extending from their edges in the direction of the semicircular portion of the U-bolt with the edges of the flanges on the inner circumferential side of the sheet metal strip forming tangential extensions of the edges of said circumferential portion, a radially inwardly directed protrusion extending lengthwise around the inner circumference of said saddle, and nuts threadedly connected to the free ends of said tangential arms.

6. An external clamp as claimed in claim 5 wherein said radially inwardly directed protrusion is a wire element seated lengthwise around the inner circumference of said saddle with loops at its ends through which said tangential arms pass.

7. An external clamp as claimed in claim 5 wherein said radially inwardly directed protrusion is a radially inwardly directed ridge formed in the sheet metal strip around the inner circumference thereof.

8. An external clamp for securing telescoped metal tubes together comprising a pair of opposed interengaged members, each member having a semi-circular portion and parallel spaced tangential portions integral therewith, the semi-circular portion of at least one of said members including an arcuately bent flexible sheet metal strip which is directed radially outwardly at its opposite end portions with bolt holes in said opposite end portions, said opposite end portions having spaced parallel integral flanges projecting in the general direction of the semi-circular portion of the other member with the radially inner edges of said flanges forming tangential extensions of the edges of the semi-circular portion of said one member, the semicircular portion of each of said members including a radially innermost ridge-like part extending around the inner circumference of such member, and threaded means for drawing said members together, said tangential portions cooperating with the ridge-like parts to effect substantially three hundred sixty degree deformation of the outer metal tube into the inner metal tube when said members are drawn together by said threaded means.

9. An external clamp as is claimed in claim 8 wherein the ridge-like part in said one member is a wire element extending lengthwise around the inner circumference of said one member with loops at its ends which are retained by said threaded means.

10. An external clamp as is claimed in claim 8, wherein the ridge-like part in said one member is a radially inwardly directed ridge formed in the sheet metal strip around the inner circumference thereof.

11. An external clamp as is claimed in claim 8 wherein said other member is shaped the same as said one member with the flanges of said members being telescoped together.

12. An external clamp for securing telescoped metal tubes together comprising a pair of opposed interengaged members, each member being a sheet metal strip with a flexible semi-circular portion terminating in radially outwardly directed end portions, said end portions having bolt holes therethrough and having spaced integral flanges projecting toward the other member with the inner edges of said flanges forming tangential extensions of the edges of the semi-circular portion of the strip, the flanges of one end portion being more closely spaced together than on the other end portion so that the adjacent end portions of the interengaged members will be telescoped together, and bolts extending through the holes of each pair of adjacent end portions and secured in place by nuts threadedly connected thereto.

13. An external clamp as claimed in claim 12 wherein said members have radially inwardly projecting ridges extending lengthwise through said semi-circular portions.

14. An external clamp for securing telescoped metal tubes together comprising a pair of opposed interengaged members, each member being a sheet metal strip with a flexible semi-circular portion terminating at opposite ends in radially outwardly directed end portions, said end portions having box-like flanges extending from their edges in the direction of the opposite member with the edges of the flanges on the inner circumferential side of the metal strip forming respectively tangential extensions of the edges of the semi-circular portion, the box-like flanges of one end portion being more closely arranged than at the other end portion so that the opposed end portions of said members are telescoped together, bolts extending through the holes of each pair of telescoped end portions, and nuts threadedly connected to said bolts.

References Cited in the file of this patent

UNITED STATES PATENTS

| | | |
|---|---|---|
| 186,435 | Parsons | Jan. 23, 1877 |
| 473,537 | Weidaw | Apr. 26, 1892 |
| 863,887 | Stuttle | Aug. 20, 1907 |
| 1,482,564 | Isachson | Feb. 5, 1924 |
| 1,777,884 | Horix | Oct. 7, 1930 |
| 1,798,613 | Manson | Mar. 31, 1931 |
| 1,818,625 | Hunter | Aug. 11, 1931 |
| 2,252,579 | Rosen | Aug. 12, 1941 |
| 2,705,121 | Kaminky et al. | Mar. 29, 1955 |
| 2,705,603 | Bitz et al. | Apr. 5, 1955 |

FOREIGN PATENTS

| | | |
|---|---|---|
| 634,692 | Germany | Jan. 18, 1937 |
| 826,451 | France | Jan. 4, 1938 |
| 358,334 | Italy | Apr. 12, 1938 |
| 208,817 | Australia | June 28, 1957 |